(12) United States Patent
Kraft

(10) Patent No.: US 6,295,739 B1
(45) Date of Patent: Oct. 2, 2001

(54) MEASURING TAPE HOLDING SYSTEM

(76) Inventor: Wendell P. Kraft, 3157 Patton Dr., Des Plaines, IL (US) 60018

( * ) Notice: Subject to any disclaimer, the term of this patent is extended or adjusted under 35 U.S.C. 154(b) by 0 days.

(21) Appl. No.: 09/212,500

(22) Filed: Dec. 15, 1998

Related U.S. Application Data

(63) Continuation-in-part of application No. 08/759,194, filed on Dec. 5, 1996, now Pat. No. 5,875,174.

(51) Int. Cl.[7] ........................................................ G01B 3/10
(52) U.S. Cl. .................. 33/758; 33/770; 33/755
(58) Field of Search ............................. 33/755, 756, 758, 33/759, 760, 768, 770, 668, 42, 27.03; D10/72, 74

(56) References Cited

U.S. PATENT DOCUMENTS

| | | | |
|---|---|---|---|
| 2,976,614 | * 3/1961 | Matuszewski et al. | 33/27.03 |
| 4,103,426 | * 8/1978 | Robin | 33/27.03 |
| 4,864,734 | * 9/1989 | Woodard et al. | 33/770 |
| 5,172,486 | * 12/1992 | Waldherr | 33/770 |
| 5,240,338 | * 8/1993 | Jye | 33/27.03 |
| 5,349,760 | * 9/1994 | DeVito | 33/668 |
| 5,421,100 | * 6/1995 | Leore | 33/758 |
| 5,515,617 | * 5/1996 | Canfield | 33/770 |
| 5,542,184 | * 8/1996 | Beard | 33/770 |
| 5,782,007 | * 7/1998 | Harris | 33/770 |

\* cited by examiner

*Primary Examiner*—Andrew H. Hirshfeld
(74) *Attorney, Agent, or Firm*—Dillis V. Allen, Esq.

(57) ABSTRACT

A system for holding the end tab of a retractable tape while the user swings measured arcs on the floor including a holder body having a pivot point fixed with respect to the floor and a spaced slot for receiving the tape end tab. The configuration of the holder body and slot is such that, after the holder body is fixed to the floor, the user can extend the end of the tape, and hook it to the body while standing erect and without manipulating the holder body.

9 Claims, 3 Drawing Sheets

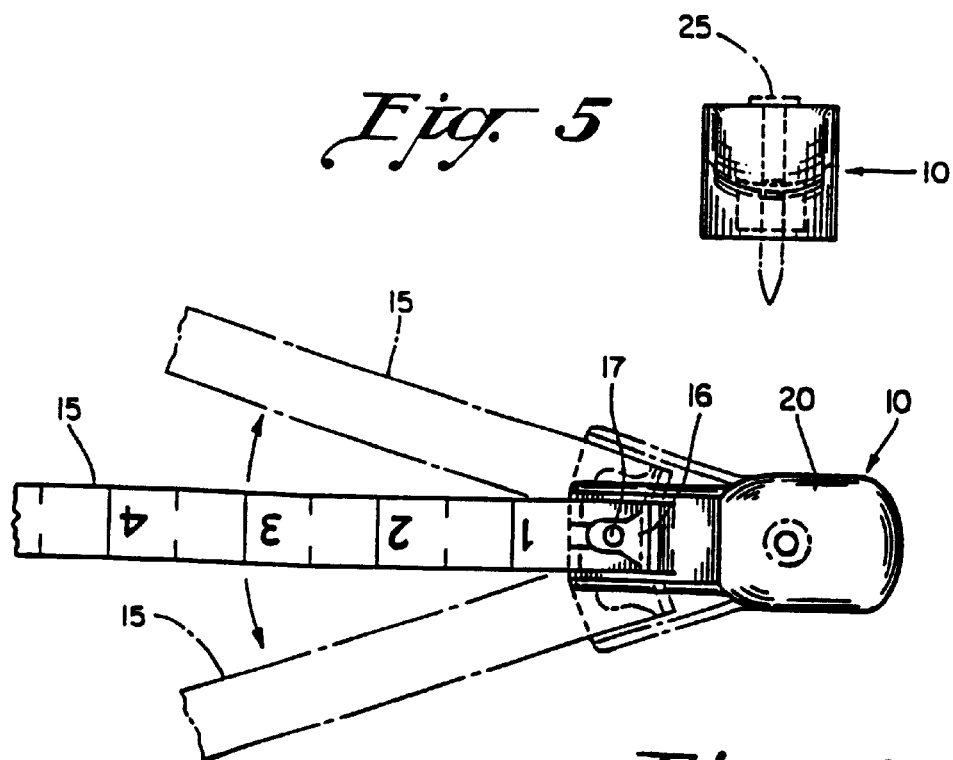
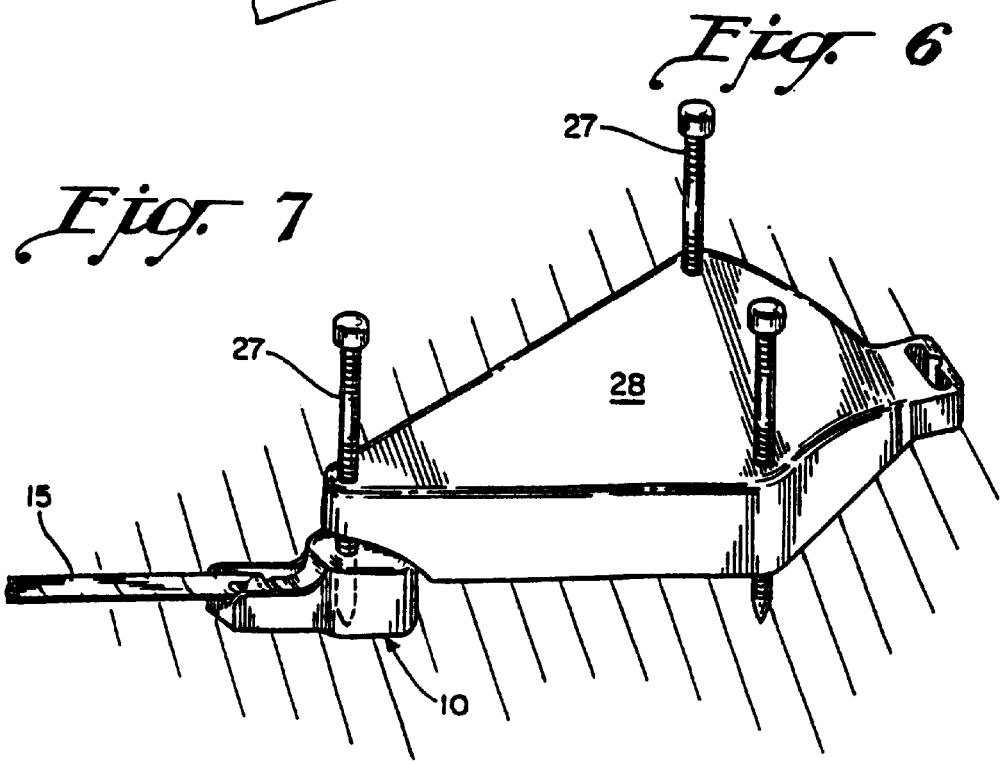

MEASURING TAPE HOLDING SYSTEM

RELATED APPLICATION

This application is a continuation-in-part of my U.S. application, Ser. No. 08/759,194, Filed: Dec. 5, 1996, entitled "MEASURING TAPE HOLDING SYSTEM" now U.S. Pat. No. 5,873,174, Issued: Feb. 23, 1999.

BACKGROUND OF THE INVENTION

There have in the past been provided many devices to hold the zero end of a measuring tape in a fixed position so that one person can make various measurements without the need for a helper to hold the tape in position. Such devices are particularly useful for contractors, surveyors, and other types of professional and trade people but can also be used by the homeowner for various projects around the home.

Some of these devices are capable of holding the end of the tape while swinging a measured arc while hand holding the tape housing.

One such device is disclosed in the Lynde, U.S. Pat. No. 3,662,471, issued May 16, 1972, which shows a cast iron block 10 with a hook-eye 14 at one end and a hook 13 at the other end. The block hook is designed, as seen in FIG. 7, to hold a loop-type tape and the hook-eye 14 as shown in FIG. 5, is adapted to hold a hook-type tape end. The bottom of the block 12 is bonded to a piece of foam material 15 for the purpose of frictionally engaging the ground or floor to hold the device from sliding. The foam 15 is a problem because it permits the block to shift slightly while the tape is pulled even without the lower surface of the foam 15 sliding simply by the lateral deformation of the foam. Another problem with this design is that the block 12 is usually positioned between the mark, such as the vertical wall, at the beginning of the tape so that compensation is required to make measurements. Lynde attempts to solve this problem in FIGS. 8 and 9 with a slotted bottom in the foam, but this embodiment is suggested only for use with a chalk line and not with a tape. Furthermore, it is difficult to determine how the tape can be bent around in the fashion shown with the chalk line 27 in FIGS. 8 and 9 without causing either damage to the tape or again requiring some measurement compensation.

The tape line shown in the Rand, U.S. Pat. No. 1,290,350, issued Jan. 17, 1919, discloses using a pointed member, but it is in fact a screw assembly that is pivotal directly to the tape so that it is not an after-market item. The screw also must be threaded into the floor or ground, and in some applications this could be unsuitable.

The same deficiency is found in the Di Tomasso, U.S. Pat. No. 1,542,990, issued Nov. 22, 1923, because the tooth or spur 12 must be driven into the work to hold the tape end in position.

The Morrison, U.S. Pat. No. 3,145,477, issued Aug. 25, 1964, and the Martin, U.S. Pat. No. 4,353,167, issued Oct. 12, 1982, show magnet-type end holders that require measurement compensation.

The Drew, et al., U.S. Pat. No. 2,711,030, issued Apr. 19, 1955, shows a suction cup tape end holder, and the Berkovic, U.S. Pat. No. 2,686,366, issued Aug. 17, 1954, shows a tape end holder that is designed specifically for clothing.

The Shields, U.S. Pat. No. 4,999,924, issued Mar. 19, 1991, shows a tape device that is not in fact a tape holder at all. In Shields, the tape is held in position against the work by tape hook 5 when the two part block member that receives the tape is not for the purpose of holding the tape in position at all, but for the purpose of making repeated measurement marks a fixed distance from the tape hook 5. That is, the two part block 3 and 4 is clamped around the tape in a position so the surface 6A is the distance desired to be marked from the tape end 5. The worker then positions the tape hook 5 over the starting position and then whacks surface 11 with a hammer causing blade 6 to mark and groove the workpiece at the desired marking location. Thus, this is not a tape end holder at all and is, therefore, not relevant.

Other patents that show tape end holders include the Buhler, U.S. Pat. No. 5,214,859, issued Jun. 1, 1993; the Knapp, U.S. Pat. No. 5,010,657, issued Apr. 30, 1991; and the Hanson, U.S. Pat. No. 3,834,030, issued Sep. 10, 1974.

The Waldherr, U.S. Pat. No. 5,172,486, cited by the Examiner in my co-pending patent application, U.S. Ser. No. 08/759,194, Filed: Dec. 5, 1996, entitled "MEASURING TAPE HOLDING SYSTEM" and in the Background of the Invention in this application, discloses a fixture 70 preferably constructed from a single piece of plastic forming the body 71 having a base 72 with a rectangularly shaped central opening 73 with a rear edge 74 and a front edge 74a, in which a slot 75 is cut on one edge thereof. A retaining member 76 is vertically spaced from the surface of the base 72 and overlies the opening 73 and is connected thereto by a rear or connecting wall 77, which is vertically upstanding from the base 72.

The forward end of the tape 50 has a tab 51 that fits into a recess 82 shown in FIG. 7. A slot 75 is provided that can receive a nail 115, presumably for the purpose of holding the fixture 70 and permitting arcuate lines to be scribed on a work piece.

One disadvantage in the Waldherr construction is that it is difficult to attach the tab to the fixture 70 because it has to be threaded through the fixture and the tape actually bends upwardly. This requires holding the fixture in one hand and the tape end in the other hand, which is a cumbersome process and one that leads to delays in completing the measuring task at hand.

The Currie, U.S. Pat. No. 1,408,347, shows a spring biased pointer 14 that impales the work and defines the pivot point, but the Currie device requires a loop-type end at the end of the holder.

The Brennan, U.S. Pat. No. 2,549,287, is extremely complicated and is not practical.

The Drew, et al., U.S. Pat. No. 2,711,030, holder utilizes a suction cup with an upper pivot assembly and does not appear to be useable with a tab type tape end.

The Hipple, U.S. Pat. No. 1,786,845, and the Sell, U.S. Pat. No. 1,439,645, and the Di Tomasso, U.S. Pat. No. 1,542,990, all show work piece impaling devices permitting arcuate motion, but none appears useable with a tab-type tape end.

The same deficiencies are found in the Anderson, U.S. Pat. No. 1,248,435, and the Schmidt, U.S. Pat. No. 882,022.

The Langsner, U.S. Pat. No. 1,726,960; the Martin, U.S. Pat. No. 370,636, and the other Langsner, U.S. Pat. No. 1,798,476, all show work piece impaling tape holders, but they are not capable of drawing arcuate arcs because they include more than one work piece impaling element, which would, of course, prevent pivotal motion.

In my U.S. patent application Ser. No. 08/759,194, a system was provided for holding fast the zero end of a measuring tape to eliminate the need for a helper and permit a wide variety of measurements to be made by a single person. That measuring tape holding system includes a generally triangular body with three downwardly projecting legs that take the form of threaded screws with hardened cone points, one of which holds the tape end by engaging a notch in the tape eye of ring. The tape holding thumb screw is located at a narrow pointed end of the body and its conical end holds the measuring tape loop either directly against a vertical wall or at the juncture of two vertical walls that enable measurements to be taken directly form the wall or corner without adding the length of the holding device as required in many of the holding devices described above in the Background of this Invention. The pointed ends of the screws can also hold a tape in position and permit the user to rotate the tape to swing arcs and find diagonals. That system can also be utilized to hold a snap line or dry line at a pre-determined location to eliminate the need for a helper in that situation. Furthermore, by utilizing two of these devices at each end of a snap line or dry line, a single person can accomplish line snapping without any helpers whatsoever.

While my prior tape holder can be utilized for swinging arcs, a simpler and low-cost item can be provided to effect the more limited function of swinging arcs.

It is a primary object of the present invention to ameliorate the problems noted above in measuring tape end holding devices and to provide a simplified tape holder principally for swinging arcs with the tape.

SUMMARY OF THE PRESENT INVENTION

In accordance with the present invention, a system is provided for holding the end tab of a retractable tape while the user swings measured arcs on the floor. Toward these ends, the system includes a one-piece holder body, which may be constructed of a one-piece plastic molding, having a pivot point fixed with respect to the floor and a spaced slot for receiving the tape end tab. The configuration of the holder body and the slot are such that, after the holder body is fixed to the floor, the user can extend the end of the tape, and hook it to the body while standing erect and without manipulating the holder body. The prior art discussed in detail above is incapable of enabling the user while standing apart from the holder body on the floor to hook the tape end into the holder body without complicated manipulations of the holders and/or the tape.

Furthermore, according to the present invention, means are provided to facilitate the hooking of the tape end tab to the holder body including a ramp adjacent the slot that guides the tab down into the slot, and side walls projecting upwardly from the body that engage and guide the sides of the tape end. Also, the upper surface of the holder body adjacent the slot is arcuate in cross section to conform to the cross section of the tape. As is well known to those familiar with metallic automatically retractable tapes, the tape itself is spring steel and tends to be arcuate in cross section because of the relatively thin material utilized in their manufacture, and the heat treating process for the tape necessary to achieve the desired spring-like characteristic. Furthermore, the tape end tabs are usually fixed to the ends of the tape by rivets. Both the arcuate tape cross section and the rivets tend to push the tape end out of the tape holder, and the arcuate top surface of the body, as well as a slot in the top of the present tape holder for the rivets, minimize this effect.

Other objects and advantages of the present invention will appear more clearly from the following detailed description.

BRIEF DESCRIPTION OF THE DRAWINGS

FIG. 5 is a front view of the holder body with the tape in section;

FIG. 6 is a top view of the holder body showing the manner of swinging arcs with the tape and the tape holder body pivoting;

FIG. 7 is a perspective view illustrating the tape holder in my U.S. application Ser. No. 08/759,194, defining the pivot for the holder body according to the present invention, and;

DETAILED DESCRIPTION OF THE PREFERRED EMBODIMENT

Figure 1:
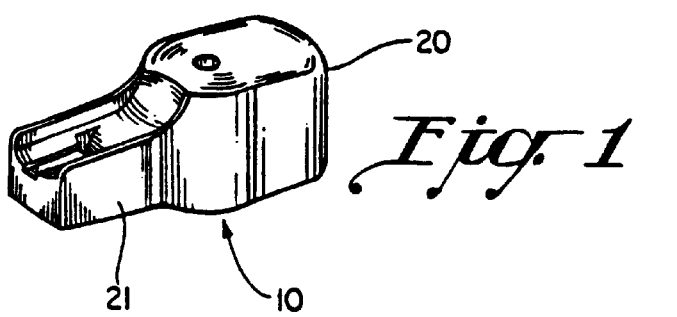
FIG. 1 is a perspective view of the present improved tape holder.
Figure 2:
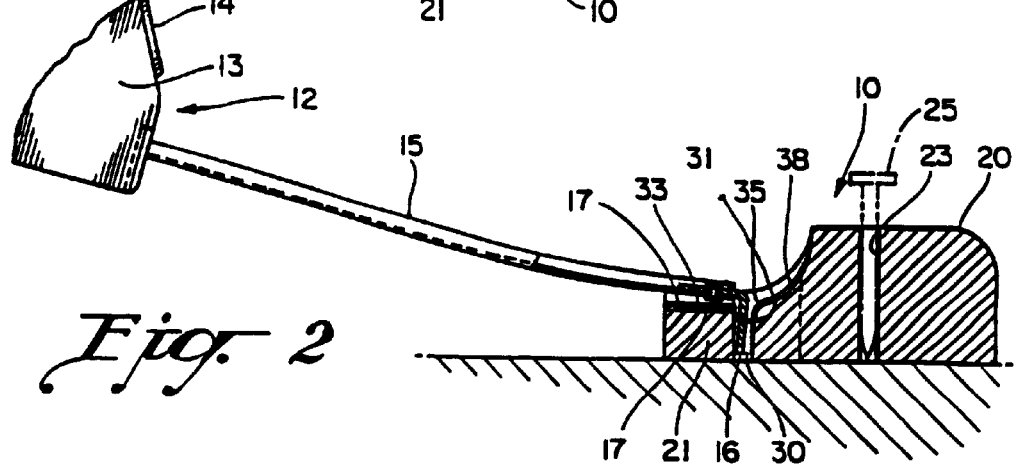
FIG. 2 is a side view of the present improved tape holder with the holder body shown in longitudinal section and with a nail defining the pivot for the holder body.

Referring to the drawings and particularly FIGS. 1 to 6, a tape holder 10, according to the present invention, is seen holding the end tab of an automatically retractable measuring tape 12, which may, for example, be a 25 foot tape. Tape 12 is seen to include a generally rectangular housing 13, an operating slide 14, metallic tape 15, and an L-shaped end tab 16 fixed to the tape end by two central rivets 17.

The tape holder 10 is a one-piece plastic molding that includes a generally circular boss portion 20 at one end connected to an integral outwardly extending leg portion 21. The cylindrical portion 20 has an enlarged through bore 23 therethrough, extending vertically, that is adapted to receive either a floor impaling nail 25, or the forward leg 27 of tape holder 28 illustrated in FIGS. 7 and 8, which is the tape holder shown and described in my U.S. application Ser. No. 08/759,194. The nail 25 or the tape holder forward leg 27 shown in FIGS. 7 and 8, define the pivotal axis for the tape holder 10.

The tape holder body portion 21 includes a vertical rectangular slot 30 therethrough that has a sharp corner edge 31 with the top forward wall 33 of body portion 21, which improves the holding function of the tape end tab 16. Slot 30 has an upper rear portion that is curved at 35 to guide the tab 16 into the slot 30. The upper rear surface 38 of the body top wall curves upwardly toward the top of the cylindrical boss portion 20 to define a ramp that assists in engaging and guiding the lower end of the tab toward the slot 30 as the user hooks the tab 16 into slot 30.

Figure 4:
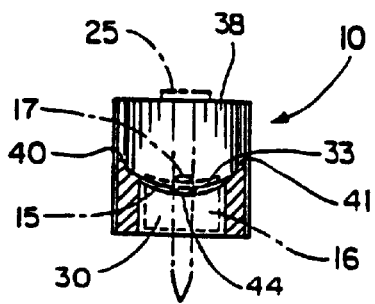
FIG. 4 is a cross section through the holder body taken generally along line 4—4 of FIG. 3.
Figure 3:
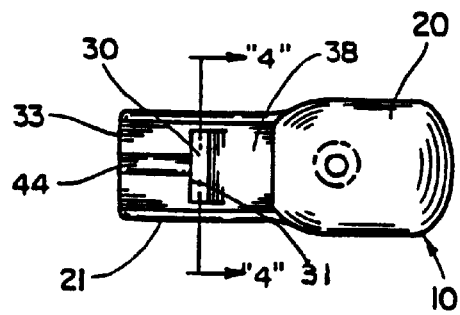
FIG. 3 is a top view of the holder body subassembly.

Furthermore, as seen in FIG. 4, the top walls 33 and 38 of the body have upwardly extending side walls 40 and 41 that engage and guide the sides of the tape 15 and tab 16.

As seen in FIGS. 4 and 5, the upper forward top surface 33 of body portion 21 is arcuate in cross section to conform to the concave shape of the tape 15, which enhances the holding ability of the tape tab 16. Furthermore, upper surface 33 is provided with an axial slot 44 that receives the tape rivets 17. Both the curvature of surface 33 and the slot 44 permit the tape tabs 16 to be seated further down in slot 30 to further enhance the holding ability of the tape holder 10.

The manner of swinging arcs with the present tape holder is illustrated in FIG. 6.

Figure 8:
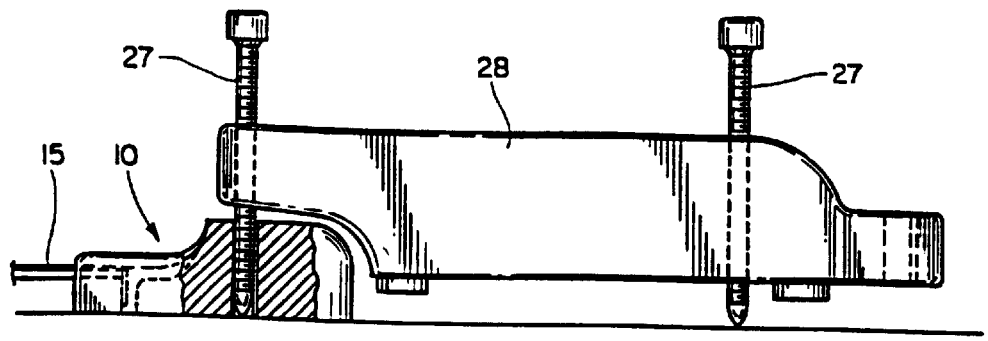
FIG. 8 is a side view of the tape holder illustrated in FIG. 7.

Furthermore, as seen in FIGS. 7 and 8, the tape holder 28 illustrated and described in my co-pending application, U.S. Ser. No. 08/759,194, can be utilized to hold my present tape holder 10 in position and permit swinging thereof. This is effected by placing the forward projection 27 in tape holder 28 in the through pivot bore 23. The use of the tape holder 28, rather than nail 25, is advisable in situations where even minor floor damage is not acceptable.

What is claimed is:

1. A tape end holder for a retractable tape having a tab type end, comprising: a tape holder body having a pivot bore therethrough adapted to receive a vertical member for holding the body in position and permitting the body to pivot as the tape is swung in an arc, slot means in the body for receiving and holding a tape end tab, and means on the body for guiding the entry of the tape end tab in the slot means after the vertical member is positioned in the pivot bore without manipulating the tape holder body, said means to guide the tape end tab into the slot means including a ramp on the body extending upwardly from the slot means in the direction of the pivot bore that guides the tape tab as it slides down the ramp toward the slot means, said pivot bore being spaced from the slot means away from said slot means in a direction opposite the tape end so the tape end tab can be entered and removed from the slot means without removing the vertical member.

2. A tape end holder as defined in claim 1, wherein the slot means opens to the top of the body and is unobstructed so the user can drop the tape end tab easily thereon.

3. A tape end holder as defined in claim 1, wherein the vertical member includes a ground or floor impaling fastener in the pivot bore.

4. A tape end holder as defined in claim 1, wherein the vertical member includes a weighted body having a plurality of projections extending downwardly therefrom, one of said projections extending into the pivot bore in the holder body to hold the holder body in position and define the pivot therefor.

5. A tape end holder as defined in claim 1, wherein the means to guide the tape end tab into the slot means includes two upwardly extending walls on the tape holder body for engaging and guiding the sides of the tape.

6. A tape end holder as defined in claim 1, wherein the upper surface of the holder body adjacent the slot means is arcuate to conform to curvature in the tape cross section and improve the holding ability of the tape holder.

7. A tape end holder for a retractable tape having a tab type end, comprising: a tape holder body having a pivot bore therethrough adapted to receive a vertical member for holding the body in position and permitting the body to pivot as the tape is swung in an arc, slot means in the body for receiving and holding a tape end tab, and means on the body for guiding the entry of the tape end tab in the slot means after the vertical member is positioned in the pivot bore without manipulating the tape holder body, said slot means opening to the top of the body and being unobstructed so the user can drop the tape end tab easily therein, said means to guide the tape end tab into the slot means including a ramp for the tape end tab on the body extending upwardly from the slot means in the direction of the pivot bore that guides the tape tab as it slides down the ramp toward the slot means, said pivot bore being spaced from the slot means away from said slot means in a direction opposite the tape end so the tape end tab can be entered and removed from the slot means without removing the vertical member.

8. A tape end holder as defined in claim 7, wherein the vertical member includes a weighted body having a plurality of projections extending downwardly therefrom, one of said projections extending into the pivot bore in the holder body to hold the holder body in position and define the pivot therefor.

9. A tape end holder for a retractable tape having a tab type end, comprising: a tape holder body having a pivot bore therethrough adapted to receive a vertical member for holding the body in position and permitting the body to pivot as the tape is swung in an arc, slot means in the body for receiving and holding a tape end tab, and said body permitting the entry of the tape end tab in the slot means after the vertical member is positioned in the pivot bore without manipulating the tape holder body, including means to guide the tape end tab into the slot means, said means to guide the tape end tab into the slot means including a ramp on the body extending upwardly from the slot means in the direction of the pivot bore that guides the tape tab as it slides down the ramp toward the slot means, said ramp extending upwardly away from the slot means in a direction opposite the tape end, said means to guide the tape and tab into the slot means including two upwardly extending walls on the tape holder body for engaging and guiding the sides of the tape.

* * * * *